April 22, 1952     M. M. CANNON, JR     2,593,535
METHOD AND APPARATUS FOR HANDLING GLASS BATCH
Filed April 12, 1946
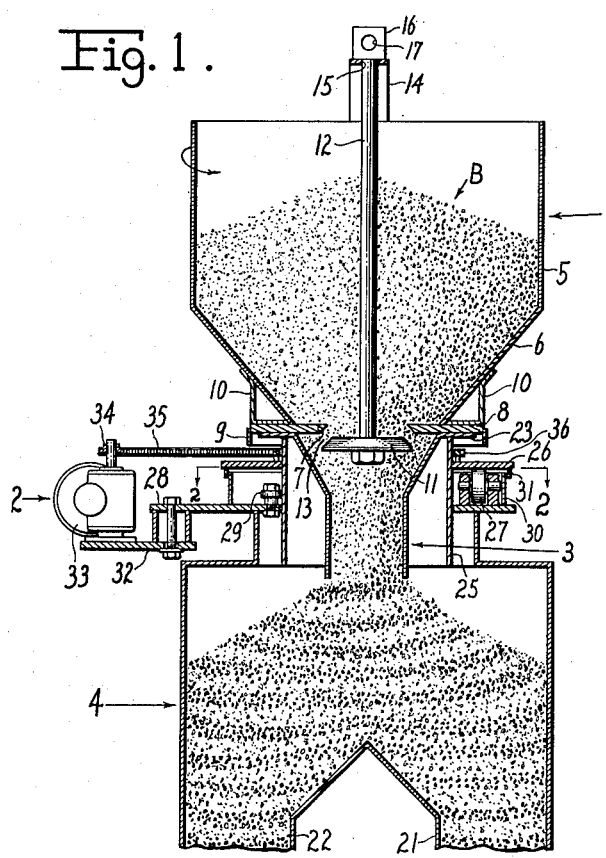
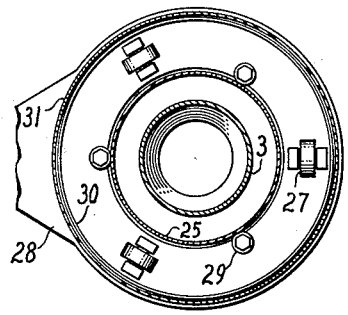
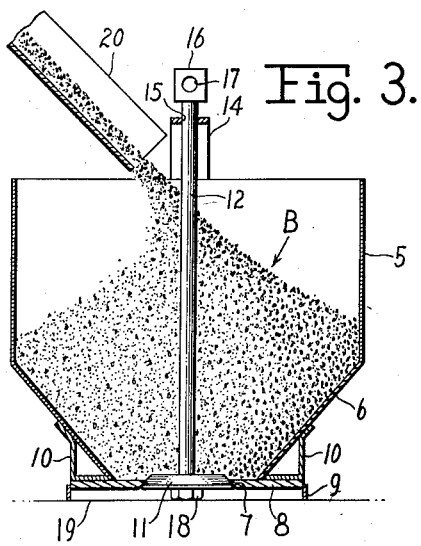
INVENTOR
MADISON M. CANNON, JR.
BY *Parham & Bates*
ATTORNEYS Patented Apr. 22, 1952

2,593,535

UNITED STATES PATENT OFFICE 2,593,535

METHOD AND APPARATUS FOR HANDLING GLASS BATCH

Madison M. Cannon, Jr., West Hartford, Conn., assignor to Emhart Manufacturing Company, a corporation of Delaware Application April 12, 1946, Serial No. 661,759

3 Claims. (Cl. 214—152)

The invention relates to improved methods of, and apparatus for, feeding glass batch to melting tanks or furnaces, and, more specifically, relates to method and apparatus for transferring glass batch from a batch bucket to a batch-feeder hopper in such a manner that the several batch constituents are substantially uniformly distributed throughout the hopper.

I have found that where the grain size of the several materials, such as, for example, sand, dolomite, soda ash and cullet in a glass batch varies, the transference of the batch from a batch mixer to batch bucket, as by gravity flow through an inclined chute or trough, results in serious segregation by grain size of the constituents deposited in the bucket and that this segregation occurs regardless of the thoroughness of the mixing operation in the mixer. Segregation that occurs in this manner is continuous and may persist from the bucket into the batch feeder hopper and through the batch feeder all the way into the furnace. As a result streams of glass of widely different composition may be produced and striae may become a major problem. The situation is aggravated in melting furnaces which operate with a straight parallel stream line flow and which consequently minimize mixing of the molten glass. Non-uniformity of the glass is even more pronounced in a melter fed by two or more batch feeders, each of which is supplied with batch from the same hopper.

Accordingly, it is an object of the invention to eliminate the above mentioned as well as other disadvantages and to provide novel means adapted to evenly and uniformly distribute batch from a batch bucket to a batch-feeder hopper.

A further object is to provide a method of, and apparatus for, delivering the batch constituents to the several points of the batch hopper in substantially unvarying proportions and to minimize segregation of heavy and light batch constituents.

Another object is to provide apparatus of the type described including a batch bucket and a cooperating vertically depending funnel or chute, wherein the bucket and funnel are rotatable about a common vertical axis to facilitate proper distribution of batch from the bucket through the funnel into the hopper.

Another object is to provide apparatus which is effective to accomplish the objects and advantage heretofore indicated when the batch-feeder hopper is employed to supply batch to a plurality of feeders.

A still further object is to provide apparatus which accomplishes the objects heretofore indicated when the batch bucket is filled with batch from a mixer through a trough or spout disposed at an acute angle to the rim of the bucket during the filling operation.

Other objects and advantages of the invention are pointed out in, or will be apparent to those skilled in the art from, the following description of the invention.

In order to more clearly explain the invention, one embodiment thereof is shown in the accompanying drawings, in which:

Figure 1 is a sectional elevation of a rotatable batch bucket and a batch hopper assembly embodying the invention;

Fig. 2 is a sectional plan view, taken at line 2—2 of Fig. 1, of mechanism controlling rotation of the batch bucket; and Fig. 3 is a sectional elevation of the batch bucket similar to the view of Fig. 1 showing the bucket in filling position relative to a batch mixer trough or spout.

Referring to the drawings, the batch handling apparatus illustrated generally comprises a batch bucket 1 detachably mountable on a bucket rotator 2 for rotation therewith and a funnel or spout 3 for delivering glass making material or batch B from the bucket 1 to a batch-feeder hopper 4.

With more specific reference to the details of the apparatus illustrated, the bucket 1 includes a cylindrical upper retaining vertical side wall 5 and an inwardly and downwardly sloping conical lower side wall 6 adapted to funnel batch to a centrally disposed circular outlet orifice 7 in the normally horizontally disposed circular bottom plate 8 of the bucket. A short peripheral lip or flange 9 depends from the plate 8 and provides a support on which to stand the bucket during the filling operation illustrated in Fig. 3.

The several portions of the bucket may be fabricated of steel sheet of sufficiently heavy gauge to withstand the weight load and abrasive action to which the bucket is subjected by repeated batch filling and emptying operations. Inasmuch as this treatment places considerable strain on the bucket it is desirable to reinforce the weaker points as, for example, by a supplemental brace or strengthening member 10. Fig. 3 illustrates the manner in which the brace 10 is arranged to support the conical position 6 of the bucket and to prevent bending or twisting of the walls of the bucket relative to the base plate 8.

While the bucket is illustrated as being of allwelded construction, riveting or other methods of fabrication may be employed in its construction.

A conical closure or valve member 11 is concentrically disposed below the bucket orifice 7 and is secured to the lower end of a rod 12 by means of which the valve may be raised to seat against the plate 8 and close the orifice 7, or lowered to provide the annular opening 13 between bucket orifice 7 and the valve member 11 through which batch flows into the funnel 3.

A U-shaped guide member 14 is secured at its ends to diametrically opposite portions of the bucket sidewalls 6 and an opening 15 centrally disposed in the cross bar of the member 14 guides the rod for vertical reciprocal movement. The engagement of the member 14 with a coupling member 16 attached to the upper end of the rod 12 limits the downward movements of the valve 11 and thereby determines the open position of the valve relative to the discharge orifice 7 and the size of the annular opening 13. The coupling member 16 is provided with a suitable coupling device such as the transverse hole 17 by means of which the member 16 may be coupled to lifting and conveying apparatus (not shown) such as, for example, a chain hoist mounted on a mono-rail conveyor. This construction assures that the valve member 11 is automatically drawn to and retained in closed position whenever the bucket by means of the coupling member 16 is lifted and transferred as between bucket filling and emptying stations.

Referring to Fig. 3, it will be seen that the rod 12 extends sufficiently below the valve member 11 so that the lower end 18 of the rod always engages the supporting floor or table surface 19, on which the bottom rim 9 of the bucket may be rested, as, for example, to receive batch from a batch mixer discharge trough 20, and when so engaged, the valve is forced to and maintained in a closed position even though no upward pull is exerted on the coupling member 16.

It will be further noted with reference to Fig. 3, that when batch containing particles of several sizes as, for example, coarse cullet and fine silica sand, is supplied from the batch mixer (not shown) through the inclined trough or spout 20 to the bucket, the proportion of heavy particles deposited in the bucket is greatest in front of the trough and least at a point diametrically opposite therefrom in the bucket and to the rear of the trough discharge point. As shown in Fig. 3, where the trough is inclined upwardly and to the left from the center of the bucket, the concentration of heavy particles is greatest on the right side of the bucket and least on the left. As a result, if, without accompanying rotation of the bucket 1, the batch were discharged directly from the bucket into the batch hopper 4, a greater proportion of the heavy particles would fall into the right-hand hopper outlet 21 than into the left-hand outlet 22. This segregation of the batch components in accordance with the particle sizes of the different components may result in as great as 30% discrepancies in the proportions of batch components discharged from the two hopper outlets 21 and 22.

I have discovered this segregation may be substantially eliminated and the proportion of large and small components in each hopper outlet 21 and 22 maintained substantially constant by rotating the bucket 1 about its vertical axis as the batch is axially discharged therefrom. To accomplish this result, I provide the bucket rotator indicated generally by the numeral 2. More specifically, the rotator includes an annular bucket supporting plate 23 having an outer diameter slightly smaller than the bucket base member 8 so that the peripheral lip 9 depends over the supporting plate 23 when the bucket is lowered on the latter and approximately aligns the orifice 7 with the funnel 3. Centrally the plate 23 is provided with a circular opening in which is secured the mouth of the funnel 3 through which batch B discharged through the open bucket orifice is guided to the hopper 4. Secured to the underside of the plate 23 is a right cylindrical member 25 which surrounds and is concentric with the funnel 3. The cylindrical member 25 is provided with a radial extending flange 26, the lower surface of which is supported for rotary movement in its own horizontal plane upon spaced rollers 27 which are mounted in suitable bearings affixed to a horizontal frame member 28. In the embodiment of the invention illustrated in the drawings, three rollers 27 are employed, the axes of which are radially disposed relative to the axis of rotation of the vertical cylinder 25. The cylinder is restrained to rotational movement about its own axis by a second group of guide rollers 29 mounted on the frame member 28 for rotation about vertical axes. These respectively may be spaced midway of adjacent supporting rollers 27. Secured to the frame plate 28 is an upwardly extending right-cylindrical guard rim 30 which surrounds all of the rollers 27 and 29. Rim 30 cooperates with a similar rim 31 of slightly larger radius which extends downwardly from the periphery of the flange 26 to provide with the flange 26, cylinder 25 and frame plate 28 a housing which protects the rollers 27 and 29. Also secured to the frame 28, as by a bracket 32, is a constant speed drive 33 which rotates the bucket supporting plate 23 through a sprocket 34, chain 35 and sprocket 36 fixed to the cylindrical member 25.

The operation of the apparatus described is as follows: The bucket 1 is filled with batch through the chute 20 from a batch mixer (not shown), the bucket outlet valve 11 being held in closed position by engagement of the lower end 18 of the rod with the floor or other surface 19 upon which the rim 9 of the bucket is rested. Thereafter the bucket is lifted by the coupling member 16 and placed on the bucket-rotating plate 23 the valve 11 being held in closed position as long as the bucket is supported by means of the coupling member 16. Release of the coupling member 16 permits the unsupported valve 11 to drop to its batch discharging position and allows the batch B to flow through the annular opening 13 and into the batch feeder hopper 4. At the same time, the bucket is continuously and slowly rotating about its own vertical axis as it feeds the batch into the batch-feeder hopper. This compound action turns the segregated batch B from the bucket 1 into a horizontal ribbon which is laid in a circular and continuous multi-layer sandwich in the hopper 4. As a result batch constituents are supplied in substantially identical proportions to all points of the batch-feeder hopper. In those installations such as, for example, the one illustrated in the drawings, where a single hopper supplies batch to a plurality of batch-feeders, the batch components are delivered in the same relative proportions through the several hopper outlets. As a result streams of glass of the same composition are formed in the melter from the batch supplied through each hopper outlet.

It will be noted that these desirable results are obtained even though the batch constituents previously had been largely segregated in the batch bucket according to the grain sizes of the several constituents.

It will be understood that in the embodiment of the invention hereinbefore described, the drawings and description have been for the purpose of illustration only, and various changes may be made therein without departing from the spirit and scope of the invention as defined in the following claims.

I claim:

1. In batch feeding apparatus, a batch bucket having a batch discharge orifice in its bottom, means for removably supporting said batch bucket with its discharge orifice in an operative position with respect to a receiver for the batch, said operative position locating the discharge orifice for direct unobstructed delivery of the batch into said receiver, and means to obtain relative rotational movement between said bucket and said receiver about an axis passing through said outlet.

2. The method of handling glass batch containing batch constituents of various grain sizes which comprises filling a batch bucket with batch, establishing a vertical, solid stream of batch by gravity flow from the bucket directly into a receiver and imparting a rotational component to the stream relative to the receiver about a vertical axis centrally located in the stream whereby the batch collects in the receiver in a continuous and circular multi-layer sandwich.

3. Apparatus for supplying glass batch to a batch-feeder hopper comprising a batch bucket, means for rotating said bucket above and relative to said hopper, and a discharge outlet in said bucket for discharging batch from the rotating bucket directly into the hopper, said outlet having unobstructed communication with the interior of said hopper along the axis of rotation of said bucket.

MADISON M. CANNON, Jr.

REFERENCES CITED

The following references are of record in the file of this patent:

UNITED STATES PATENTS

| Number | Name | Date |
|---|---|---|
| 727,753 | Cromwell et al. | May 12, 1903 |
| 829,544 | Roberts | Aug. 28, 1906 |
| 864,795 | McKee | Sept. 3, 1907 |
| 890,569 | McKee | June 9, 1908 |
| 1,065,960 | Murray | July 1, 1913 |
| 1,371,084 | Ferguson | Mar. 8, 1921 |
| 1,549,141 | McGregor | Aug. 11, 1925 |
| 1,806,623 | Gleason | May 26, 1931 |
| 1,936,374 | Barks | Nov. 21, 1933 |

FOREIGN PATENTS

| Number | Country | Date |
|---|---|---|
| 5,465 | Great Britain | Mar. 15, 1905 |
| 700,319 | Germany | Dec. 18, 1940 |